C. W. HEATH.
RECORDER.
APPLICATION FILED OCT. 15, 1913.
1,119,956.
Patented Dec. 8, 1914.
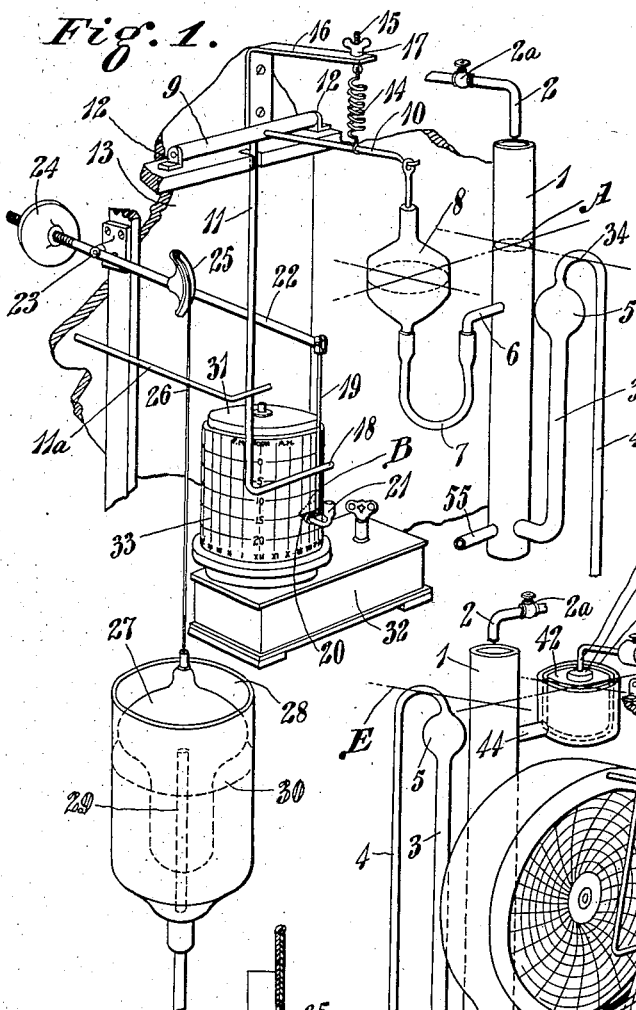
Fig. 1.
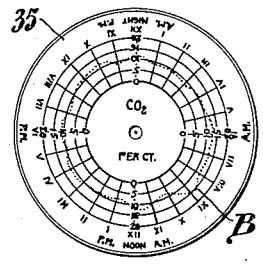
Fig. 3.
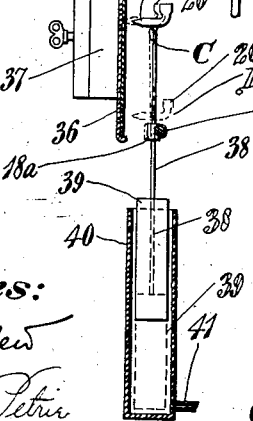
Fig. 2.
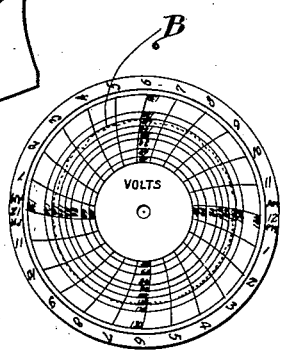
Fig. 4.
Fig. 5.
Witnesses:
Clarence Perdew
Abraham L. Petrie
Inventor
Charles W. Heath
By James A. Ramsey
Attorney

UNITED STATES PATENT OFFICE.

CHARLES W. HEATH, OF CINCINNATI, OHIO.

RECORDER.

1,119,956.  Specification of Letters Patent.  Patented Dec. 8, 1914.

Application filed October 15, 1913. Serial No. 795,237.

*To all whom it may concern:*

Be it known that I, CHARLES W. HEATH, a citizen of the United States, residing at Cincinnati, in the county of Hamilton and State of Ohio, have invented certain new and useful Improvements in Recorders, of which the following is a specification.

My invention relates to recorders for making a permanent record of the movements of machines or instruments, the movements of which are desired to be recorded and preserved, whether such recorder be incorporated in the machine or instrument itself or whether it be merely an accessory to the machine or instrument and whether the record to be made shall be intermittent or continuous.

The object of my invention is to produce such intermittent or continuous record by means of a series of momentary contacts of the marking element upon the recording surface, thereby eliminating the modifying influences due to the variations in character of the different regions of the recording surface as encountered by a marking element constantly in contact with such surface throughout the relative movements of the recording surface and marking element.

My invention is particularly applicable to machines or instruments wherein the actuation of the marking element is comparatively weak, or wherein the measurements to be recorded must be very accurate; in either case requiring a high degree of precision and delicacy in the construction and operation of the machine or instrument throughout.

Owing to the use of a liquid as the means for providing the intermittent actuation that is to momentarily apply the marking element, my invention is more especially useful in connection with machines or instruments wherein liquids are measured or otherwise are involved in the operation of the machine or instrument. An example of such an instrument is an apparatus for analyzing successive charges of gas, such as products of combustion, and recording the successive analyses.

My invention consists in the parts and in the details of construction and arrangement of parts as will hereinafter be more fully described and claimed.

In the drawing: Figure 1 is a general perspective view illustrating the use of my invention in connection with a gas analysis apparatus, parts only of the analysis apparatus being shown, a weighted element causing the momentary contact, the recording surface being cylindrical, and the marking element moving in a straight line; Fig. 2 illustrates a modification of the device, with a plane recording surface and with part of a gas analysis apparatus, which is also modified, and illustrating, by the use of dotted lines, the different positions of the marking element as actuated by the analysis apparatus and by means of my invention; Fig. 3 is a detail of a chart suitable for use on the device illustrated in Fig. 2; Fig. 4 is a general perspective view of a modification of my invention in which the momentary contact is caused by a buoyant element, and the instrument being of the type used for recording temperatures, pressures, electric current, and the like, with a plane recording surface and with a marking element moving through a curve; and Fig. 5 is a detail of a chart suitable for use on the device illustrated in Fig. 4, for recording voltage.

My invention as shown in Fig. 1, comprises a container or stand pipe 1 into which liquid flows constantly from a supply pipe 2, controlled by a valve 2$^a$, said stand pipe being open to the atmosphere. Near the lower end of the stand pipe 1 the shorter leg 3 of a siphon communicates with the interior of the stand pipe and rises and merges into the longer leg 4 of the siphon through a suitable bulb 5 to eliminate the influence of air bubbles in the operation of the siphon. Suitably located, and also communicating with the interior of the stand pipe 1, is a nipple 6, and a flexible tube 7 leads from this nipple to the lower end of the chamber 8. A hub 9 carries an outwardly projected arm 10 and a downwardly projected arm 11, and is pivoted in suitable bearings 12 mounted on the framework or casing 13 which may inclose the parts of the apparatus. This hub 9 and arms 10 and 11 thus make up a bell crank, and the chamber 8 is suitably suspended near the free end of the outwardly projected arm 10. Downward movement of the arm 10 due to the weight borne by this chamber 8 is resisted by a tension spring 14 stretched from the arm 10 up to a stud 15 in a bracket 16 on the frame or casing 13, said stud having a thumb screw 17 to adjust the tension of the spring 14, as opposed by a stop 11$^a$ that limits the outward swinging of the arm 11. The lower or free end of the downwardly projected arm 11 has a transverse member 18 to make contact with a rod 19 that carries the marking element 20, which may be provided with a suitable reservoir 21 to supply the marking fluid. This rod 19 is pivoted on the free end of a lever 22 which has a fulcrum 23 on part of the framework or casing 13, and beyond this fulcrum 23 there is an adjustable weight 24. Fixed on the lever 22, between the fulcrum 23 and the rod 19, is a segment 25 to which a flexible element 26 is connected, which, running over the arc of the segment, suspends a receiver 27 in a vessel 28. A tube 29 extends up through the bottom of the vessel 28, and liquid 30 is contained in the vessel 28 filling the lower end of the receiver 27, with the tube 29 extending above the surface of the liquid into the interior of the receiver 27. It will be understood that this device with the receiver 27 may operate in connection with any suitable other elements of a gas analysis apparatus which may force or admit air or gas through the tube 29 into the exterior of the receiver 27 so that said receiver will rise with the arm 22 under the counterbalancing action of the weight 24. A suitable drum 31 turns on an upright axis, its movement being caused and controlled by a suitable clockwork mechanism in the case 32. A suitable rectangular chart 33 is placed around the surface of the drum 31 in the well known manner, and when the arm 22 rises or falls it will raise or lower the marking element 20; and if this marking element contacts with the surface of the chart 33 at any time during its rising and falling, or when stationary, it will make a mark at a corresponding elevation on the shart. Such operation of the recording device in connection with the analysis apparatus with the marking element constantly in contact with the chart is well known, and is described herein only to elucidate the explanation of my invention as applied to such chart and marking element.

The stand pipe 1 with its supply pipe 2 and the siphon as described, may be those making up part of the gas analysis apparatus; and as before noted my invention is especially applicable to such apparatus where these elements are already present as a part of that apparatus.

The operation of this device, constructed as shown in Fig. 1 and above described, depends upon the increase of weight on the outwardly projected arm 10 due to an increase in quantity of liquid in the chamber 8. The rod 19 carrying the marking element 20 is so positioned relative to the chart 33 that the rod 19 is freely suspended and swings out from the chart 33 close to the transverse member 18 of the arm 11, and the marking element 20 will not make contact with the chart 33 until the chamber 8 has received enough liquid to overcome the tension of the spring 14 and, by drawing the outwardly projected arm 10 down, swing the downwardly extended arm 11 inward with its transverse part 18 pushing the rod 19 inward toward the chart 33. Then, as long as the weight of liquid in the chamber 8 remains sufficient to maintain this position, the contact of the marking element 30 with the chart 33 will continue. To provide intermittent action is the purpose of the stand pipe 1 with its siphon and its liquid supply in connection with the chamber 8. As above stated, the supply of liquid through the supply pipe 2 is constant, and the liquid will rise in the stand pipe 1 and shorter leg 3 of the siphon until it reaches the level A, upon which it will flow over the bend 34 of the siphon and out through the longer leg 4 thereof. As this liquid rose in the stand pipe 1 and the leg 3, it also flowed through the nipple 6 and flexible connection 7 and rose in the chamber 8. The parts are so proportioned and positioned that, at about the instant that this limit of rise of the liquid is reached at the level A, the arm 10 will be drawn down as above described, under the weight of the amount of liquid thus occupying the chamber 8, thereby applying the marking element 20 to the chart 33. Furthermore, the rate of constant flow of liquid through the supply pipe 2 is so regulated that the outflow through the siphon, once started, upon reaching the bend 34, will be much faster than the inflow from said supply pipe 2; and the liquid will fall rapidly in the stand pipe 1, and consequently in the chamber 8, which will be rapidly emptied, upon which the spring 14 will raise the arm 10, swinging the arm 11 outward with its transverse part 18, and permitting the rod 19 to swing outward, withdrawing the marking element 20 from the chart 33. The outflow through the siphon will continue until the level of the liquid in the stand pipe 1 falls below the opening from the stand pipe into the leg 3 of the siphon when the liquid seal will be broken, allowing air to enter the leg 3, and temporarily destroying the action of the siphon. Then the supply through the supply pipe 2, which has continued, will gradually fill the stand pipe 1 again to the level A, upon which the above described operation will be repeated. These operations will recur at regular intervals, of length depending upon the rate of inflow of liquid, or upon dimensions of the various parts, or upon both conditions. If the liquid flows in rapidly the marking element 20 will be brought into contact with the chart 33 frequently, or if the device be constructed with the dimensions of the various parts diminished, the level A will be reached sooner with a given rate of supply. Furthermore, the duration of contact of the marking element will depend somewhat upon the rate of outflow, which determines the length of time required for sufficient liquid to flow out of the chamber 8 to reduce its weight and permit the spring 14 to raise said chamber along with the arm 10. All of these elements may be properly adjusted in accordance with the number of records to be made per hour or the desired spacing of the marks upon the chart which will also depend upon the speed of the drum 31, this being in most cases rotated once in twenty-four hours. It may be explained that the movement of the chart is so slow relative to these operations of the device that the record on the chart will consist of a series of dots of no appreciable length and very close together, so that this record if desired may be made practically a continuous line, or may be a fine dotted line as indicated at B in Figs. 1, 3 and 4 and will be as suitable for all practical purposes as would a continuous line.

In the device shown in Fig. 2, the plane circular chart 35 is carried around with a disk 36 rotated by suitable clockwork in the case 37. Such a chart is shown in Fig. 3 properly graduated to record the percentages of carbon dioxid in measured samples of products of combustion, as, for instance, those from a boiler furnace. In Fig. 2, the marking element 20 is carried near the upper end of a rod 38 mounted on a float 39 in a vessel 40, so that the marking element 20 is raised or lowered according to variations produced by the analysis apparatus and as communicated through a pipe 41 leading into the vessel 40. Of the apparatus shown in Fig. 1 and above described, the only part that is shown in Fig. 2 is the transverse part 18 of the arm 11, it being understood that the bell crank, the hollow chamber and the stand pipe and its accessories may be as shown in Fig. 1 and as before described. Here the solid lines indicate the marking element 20 in a raised position and withdrawn from the recording surface, and the upper dotted lines at C indicate the marking element drawn over against the recording surface, while the lower dotted lines at D indicate the marking element in lowered position and drawn away from the recording surface. The free action of the float 39 makes it desirable to provide a small guide 18ᵃ on the transverse part 18, for the rod 38 that supports the marking element 20, which guide, however, engages very lightly with said rod.

In Fig. 4, the stand pipe 1 and its supply pipe 2 and the siphon with the legs 3 and 4 are similar to those shown in Fig. 1 and above described. Here, however, instead of the chamber 8, a float 42 is provided in a vessel 43 that connects to the stand pipe 1 through a short pipe 44, which need not be flexible since the vessel 43 is stationary and the float 42 is the movable element. This float 42 may be a hollow body or it may be solid and of buoyant material, such as cork. On its top this float may have a suitable contact surface 45, and a hub 46 has an arm 47 projecting over with a downwardly extended part 48 making contact with the contact surface 45. This hub 46 also has a downwardly extended arm 49 with a transverse part 50, so that this hub and arms 47 and 49 make up a bell crank similar to that shown in Fig. 1, but with the exception that it is reversed with relation to the actuating element; it will be seen that this is incident to the upward operation of the float 42 instead of the downward operation of the chamber 8. In this example, a recording instrument, such as a temperature or pressure recorder, is operated with the use of my invention. Such an instrument being well known, it need not be further described than to say that its casing 51 may contain suitable clockwork to rotate the plane circular chart 52, and its lever 53, carrying the marking element 54, must be sufficiently flexible, or otherwise have sufficient movement inward toward the chart 52 and outward therefrom, to properly operate in connection with my invention. The transverse part 50 of the arm 49 should not bear against this lever 53 until the marking element 20 is to engage with the chart, and normally this arm remains in its outward position with its part 50 a short distance away from the lever 53, and with the marking element 54 withdrawn from the chart 52. When the liquid, by constant supply from the supply pipe 2, rises to the level E, it will flow over the bend in the siphon and its level will begin to fall. Just previous to this time the liquid has also risen in the vessel 43 sufficiently to raise the float 42 which, by raising the arm 47 and swinging the arm 49 inward, brings the marking element 54 against the chart 52. Then, as the liquid falls, the float 42 will go down and will permit the marking element to withdraw from the chart. When the stand pipe 1 has filled again to the level E, the operation will be repeated; and the operations will recur with frequency governed under the same conditions as described in connection with Fig. 1. Instead of a spring, the arm 47 has an adjustable weight 47ᵃ, opposed by a stop 49ᵃ on the casing 51, for the arm 49. In the recording instrument shown in Fig. 4, the marking element 54 has a curved motion, but its operation in connection with my invention will be substantially the same as above described with reference to the marking element moving in a straight line as shown in Figs. 1 and 2.

While the chamber and cylindrical chart are associated in Fig. 1 and the float and plane circular chart are associated in Fig. 4, it will be understood that either the chamber or the float may be used as the actuating element with one or the other kind of chart, and that either actuating element may be used with any suitable apparatus provided with a chart of any kind upon which records are to be made. It will also be understood that the marking element as well as the recording surface may be of any well known character, whether the marking element be a pen, pencil, stylus or scriber, or whether the recording surface be of paper or other surface upon which the marking material is deposited, or whether it be a coated surface or other surface from which a portion is removed to make the mark.

In any of the above modifications or associations, my invention has the important advantage that it permits the record to be made without the marking element normally or continuously dragging on the recording surface. It is practically impossible to provide a recording surface which will be sufficiently uniform in quality, as regards surface or nature of the material, so insure that the marking element will not be retarded in some regions and allowed to travel more freely in other regions, thus modifying the travel of the marking element so that it does not accurately record the conditions in the instrument or machine with which it is used. The friction caused by a marking device dragging over the recording surface is a source of error in such instruments, which error my device eliminates by reason of the intermittent application of the marking element to the recording surface with only momentary contact, whereby the influence of the recording surface upon the movements of the marking element is practically eliminated, because practically all of the movement of the marking element takes place when it is withdrawn from the recording surface. The parts of the apparatus need have no great degree of movement, and being otherwise of simple construction, there is little tendency to derangement.

In gas analysis apparatus such as that shown in Figs. 1 and 2, and using charts such as that shown in Fig. 3, where the marking element is intermittently raised and lowered to record each successive analysis, the record usually consists of a series of approximately radial lines, the termination of each line indicating the percentage arrived at by the analysis. With my invention used with such apparatus, on account of the relation of the stand pipe 1 and its siphon to the analysis apparatus as well as to the mechanism of my invention, the application of the marking element will take place only at the termination of rise of the marking element; this rise of the marking element being stopped, under the influence of the stand pipe and its siphon, communicated through the pipe 55 leading from the lower part of the stand pipe, as seen in Fig. 1. The application of the marking element takes place at about this time, as before described. Thus, instead of the series of radial lines on the chart, the record will consist merely of a succession of dots, each dot being located on the chart where the termination of the corresponding radial line would be on a chart as ordinarily used in gas analysis apparatus. Here, the same advantage of eliminating the modifying influence of the friction between marking element and recording surface is attained, and also a neater and less confusing record is produced upon the chart.

From the foregoing description it will be understood that my invention is capable of considerable modification, and of application to a wide variety of measuring and indicating instruments, and that I do not wish to be understood as being limited to the examples given; but

What I claim as new and desire to secure by Letters Patent is:

1. In a recorder, a recording surface, means for making a record on said surface, a container, liquid automatically rising and falling in the container, and means whereby the rise and fall of liquid causes said means to intermittently make said record.

2. In a recorder, a recording surface, means for making a record on said surface, a container, liquid, with a free surface, automatically rising and falling in the container, and means whereby the rise and fall of liquid having the free surface causes said means to intermittently make said record.

3. In a recorder, a recording surface, a marking element to move across said surface in the operation of said recorder, a container, automatically rising and falling liquid in the container, a movable element moved according to the height of the liquid in the container, and means whereby said movable element causes said marking element to intermittently contact with said recording surface.

4. In a recorder, a recording surface, a marking element to move across said surface in the operation of said recorder, a container, liquid, with a free surface, automatically rising and falling in the container, a movable element moved according to the height in the container of said liquid with said free surface, and means whereby said movable element causes said marking element to intermittently contact with said recording surface.

5. In a recorder, a recording surface, a marking element, means supporting said marking element for movement across said surface in the operation of the recorder, a container, a liquid supply to said container, a siphon causing repeated rise and fall of liquid in said container, a movable element moved according to the height of liquid in the container, and means whereby said movable element causes said marking element to intermittently contact with said recording surface.

6. In a recorder, a recording surface, a marking element, means supporting said marking element for movement across said surface in the operation of the recorder, a container, automatically rising and falling liquid in the container, a movable element moved according to the height of liquid in the container, and a lever coacting with the movable element and with the means supporting the marking element, whereby said movable element causes said marking element to intermittently contact with said recording surface.

7. In a recorder, a recording surface, a marking element, means supporting said marking element for movement across said surface in the operation of the recorder, a container, a liquid supply to said container, a siphon causing repeated rise and fall of liquid in said container, a movable element moved according to the height of liquid in the container, and a lever coacting with the movable element and with the means that supports the marking element, whereby said movable element causes said marking element to intermittently contact with said recording surface.

8. In a recorder, a recording surface, a marking element to move across said surface in the operation of said recorder, a container, means causing repeated rise and fall of liquid in the container, a chamber receiving liquid as the liquid rises and losing liquid as the liquid falls in the container, means whereby said chamber falls and rises as it receives and loses liquid, and means whereby the falling and rising of the chamber causes said marking element to intermittently contact with said recording surface.

9. In a recorder, a recording surface, a marking element, means supporting said marking element for movement across said surface in the operation of the recorder, a container, means causing repeated rise and fall of liquid in the container, a chamber receiving liquid as the liquid rises and losing liquid as the liquid falls in the container, a bell crank having two arms, one arm of which supports said chamber, and a yieldable support for said arm whereby said chamber depresses the arm when it receives liquid and whereby said arm is drawn upward as the chamber loses liquid, the other arm of said bell crank contacting with the means that supports the marking element and causing said marking element to intermittently contact with said recording surface as the aforementioned arm is depressed and raised.

10. In a recorder, a recording surface, a marking element, means supporting said marking element for movement across said surface in the operation of the recorder, a container, means causing repeated rise and fall of liquid in the container, a chamber receiving liquid as the liquid rises and losing liquid as the liquid falls in the container, a bell crank having two arms, one arm of which supports said chamber, a yieldable support for said arm whereby said chamber depresses the arm when it receives liquid and whereby said arm is drawn upward as the chamber loses liquid, the other arm of said bell crank contacting with the means that supports the marking element and causing said marking element to intermittently contact with said recording surface as the aforementioned arm is depressed and raised, and means for adjusting said yieldable support.

11. In a recorder, a recording surface, a marking element, means supporting said marking element for movement across said surface in the operation of the recorder, a container, a liquid supply to said container, a siphon causing repeated rise and fall of liquid in said container, a chamber receiving liquid as the liquid rises and losing liquid as the liquid falls in the container, a bell crank having two arms, one arm of which supports said chamber, and a yieldable support for said arm whereby said chamber depresses the arm when it receives liquid and whereby said arm is drawn upward as the chamber loses liquid, the other arm of said bell crank engaging with the means that supports the marking element and causing said marking element to intermittently contact with said recording surface as the aforementioned arm is depressed and raised.

12. In a recorder, a recording surface, a marking element, means supporting said marking element for movement across said surface in the operation of said recorder, a liquid supply, means comprising a guide for the aforesaid movement of the marking element, and operative connection to the means comprising the guide whereby the liquid supplied automatically causes the marketing element to intermittently contact with the recording surface.

13. In a recorder, a recording surface, a marking element, means supporting said marking element for rectilinear movement across said surface in the operation of said recorder, a liquid supply, means comprising a guide for the aforesaid movement of the marking element, and operative connection to the means comprising the guide whereby the liquid supplied causes the marking element to intermittently contact with the recording surface.

14. In a recorder, a recording surface, a marking element, means supporting said marking element for movement across said surface in the operation of the recorder, a container, a liquid supply to said container, a siphon causing repeated rise and fall of liquid in said container, a movable element moved according to the height of liquid in the container, and operative connection from the movable element to the supporting means for the marking element, comprising a guide for said supporting means in the aforesaid movement of the marking element, said operative connection transmitting the motion of the movable element to the supporting means, whereby the marking element is caused to intermittently contact with the recording surface.

15. In a recorder, a recording surface, a marking element, means supporting said marking element for movement across said surface in the operation of the recorder, a container, means to cause repeated rise and fall of liquid in said container, a movable element moved in accordance with the rise and fall of liquid in the container, a bell crank having two arms, one arm of which coacts with the movable element, and a guide on the other arm of the bell crank for the supporting means of the marking element, to guide said supporting means in the aforesaid movement of the marking element, said bell crank thereby transmitting the motion of the movable element to the supporting means, whereby the marking element is caused to intermittently contact with the recording surface.

16. In a recorder, a recording surface, a marking element, means supporting said marking element for movement across said surface in the operation of said recorder, a container, means to cause repeated rise and fall of liquid in said container, a movable element moved in accordance with the rise and fall of liquid in the container, a bell crank having two arms, one of which coacts with the movable element, and a part of the other arm projecting across the supporting means of the marking element, said bell crank being moved by the movable element whereby said part of said arm contacts with the supporting means of the movable element to cause said marking element to intermittently engage with the recording surface.

17. In a recorder, a recording surface, a marking element to move across said surface with the operation of said recorder, an element yieldable under the action of gravity, means for repeatedly varying the weight imposed upon said movable element to cause movement thereof, and means whereby the movement of said movable element causes said marking element to intermittently contact with said recording surface.

18. In a recorder, a recording surface, a marking element to move across said surface with the operation of said recorder, an element yieldable under the action of gravity, means for repeatedly varying the weight imposed upon said movable element to cause movement thereof, means whereby the movement of said movable element causes said marking element to intermittently contact with said recording surface, and means for adjusting the yieldableness of said movable element to the action of gravity.

CHARLES W. HEATH.

Witnesses:
 JAMES N. RAMSEY,
 CLARENCE PERDEW.

---

Correction in Letters Patent No. 1,119,956.

It is hereby certified that in Letters Patent No. 1,119,956, granted December 8, 1914, upon the application of Charles W. Heath, of Cincinnati, Ohio, for an improvement in "Recorders," an error appears in the printed specification requiring correction as follows: Page 5, line 117, for the word "marketing" read *marking;* and that the said Letters Patent should be read with this correction therein that the same may conform to the record of the case in the Patent Office.

Signed and sealed this 4th day of May, A. D., 1915.

[SEAL.]

R. F. WHITEHEAD,
*Acting Commissioner of Patents.*